US010836315B2

(12) United States Patent
King

(10) Patent No.: US 10,836,315 B2
(45) Date of Patent: Nov. 17, 2020

(54) MIRROR DISPLAY SYSTEM WITH BLIND SPOT DISPLAY

(71) Applicant: Magna Services of America Inc., Troy, MI (US)

(72) Inventor: Jonathan A. King, Novi, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 46 days.

(21) Appl. No.: 16/177,533

(22) Filed: Nov. 1, 2018

(65) Prior Publication Data
US 2019/0135181 A1  May 9, 2019

Related U.S. Application Data

(60) Provisional application No. 62/581,936, filed on Nov. 6, 2017.

(51) Int. Cl.
 *B60R 1/02* (2006.01)
 *B60R 1/00* (2006.01)
 *B60R 1/12* (2006.01)

(52) U.S. Cl.
 CPC ............... *B60R 1/02* (2013.01); *B60R 1/00* (2013.01); *B60R 1/12* (2013.01); *B60R 2001/1253* (2013.01); *B60R 2300/70* (2013.01); *B60R 2300/8026* (2013.01)

(58) Field of Classification Search
 CPC .... B60R 1/02; B60R 1/12; B60R 1/00; B60R 2001/1253; B60R 2300/8026; B60R 2300/70
 See application file for complete search history.

(56) References Cited

U.S. PATENT DOCUMENTS

| | | | |
|---|---|---|---|
| 2,263,382 | A | 11/1941 | Gotzinger |
| 2,580,014 | A | 12/1951 | Gazda |
| 3,266,016 | A | 8/1966 | Maru |
| 4,499,451 | A | 2/1985 | Suzuki et al. |
| 4,588,267 | A | 5/1986 | Pastore |
| 4,623,222 | A | 11/1986 | Itoh et al. |
| 4,630,904 | A | 12/1986 | Pastore |
| 4,721,364 | A | 1/1988 | Itoh et al. |
| 4,793,690 | A | 12/1988 | Gahan et al. |
| 4,906,085 | A | 3/1990 | Sugihara et al. |
| 5,193,029 | A | 3/1993 | Schofield et al. |
| 5,285,060 | A | 2/1994 | Larson et al. |
| 5,313,335 | A | 5/1994 | Gray et al. |
| 5,355,284 | A | 10/1994 | Roberts |

(Continued)

*Primary Examiner* — James M Pontius
(74) *Attorney, Agent, or Firm* — Honigman LLP

(57) ABSTRACT

A mirror display system for a vehicle includes an interior rearview mirror assembly having a mirror head and a display device having a video display screen disposed in the mirror head and behind the reflective element of the mirror head. The display screen, when actuated, is viewable through the reflective element. The display screen, when actuated, displays video images derived from image data captured by one or more of a plurality of vehicle-mounted cameras that have respective fields of view exterior of the vehicle. Responsive to a driver's touch at a respective region of the turn signal actuator of the vehicle, the video display screen displays video images derived from image data captured by a respective side camera so as to display video images of the blind zone at the respective side of the vehicle.

17 Claims, 4 Drawing Sheets

(56) References Cited

U.S. PATENT DOCUMENTS

| | | |
|---|---|---|
| 5,371,659 A | 12/1994 | Pastrick et al. |
| 5,416,313 A | 5/1995 | Larson et al. |
| 5,436,741 A | 7/1995 | Crandall |
| 5,481,409 A | 1/1996 | Roberts |
| 5,497,306 A | 3/1996 | Pastrick |
| 5,530,240 A | 6/1996 | Larson et al. |
| 5,575,552 A | 11/1996 | Faloon et al. |
| 5,587,699 A | 12/1996 | Faloon et al. |
| 5,668,663 A | 9/1997 | Varaprasad et al. |
| 5,669,699 A | 9/1997 | Pastrick et al. |
| 5,724,187 A | 3/1998 | Varaprasad et al. |
| 5,786,772 A | 7/1998 | Schofield et al. |
| 5,788,357 A | 8/1998 | Muth et al. |
| 5,823,654 A | 10/1998 | Pastrick et al. |
| 5,929,786 A | 7/1999 | Schofield et al. |
| 5,938,320 A | 8/1999 | Crandall |
| 6,005,724 A | 12/1999 | Todd |
| 6,045,243 A | 4/2000 | Muth et al. |
| 6,111,683 A | 8/2000 | Cammenga et al. |
| 6,176,602 B1 | 1/2001 | Pastrick et al. |
| 6,198,409 B1 | 3/2001 | Schofield et al. |
| 6,227,689 B1 | 5/2001 | Miller |
| 6,257,746 B1 | 7/2001 | Todd et al. |
| 6,264,353 B1 | 7/2001 | Caraher et al. |
| 6,276,821 B1 | 8/2001 | Pastrick et al. |
| 6,329,925 B1 | 12/2001 | Skiver et al. |
| 6,356,376 B1 | 3/2002 | Tonar et al. |
| 6,420,975 B1 | 7/2002 | DeLine et al. |
| 6,428,172 B1 | 8/2002 | Hutzel et al. |
| 6,512,624 B2 | 1/2003 | Tonar et al. |
| 6,582,109 B2 | 6/2003 | Miller |
| 6,690,268 B2 | 2/2004 | Schofield et al. |
| 6,700,692 B2 | 3/2004 | Tonar et al. |
| 6,882,287 B2 | 4/2005 | Schofield |
| 6,902,284 B2 | 6/2005 | Hutzel et al. |
| 7,038,577 B2 | 5/2006 | Pawlicki et al. |
| 7,046,448 B2 | 5/2006 | Burgner |
| 7,184,190 B2 | 2/2007 | McCabe et al. |
| 7,195,381 B2 | 3/2007 | Lynam et al. |
| 7,224,324 B2 | 5/2007 | Quist et al. |
| 7,253,723 B2 | 8/2007 | Lindahl et al. |
| 7,255,451 B2 | 8/2007 | McCabe et al. |
| 7,274,501 B2 | 9/2007 | McCabe et al. |
| 7,338,177 B2 | 3/2008 | Lynam |
| 7,370,983 B2 | 5/2008 | DeWind et al. |
| 7,492,281 B2 | 2/2009 | Lynam et al. |
| 7,581,859 B2 | 9/2009 | Lynam |
| 7,626,749 B2 | 12/2009 | Baur et al. |
| 7,720,580 B2 | 5/2010 | Higgins-Luthman |
| 7,734,392 B2 | 6/2010 | Schofield et al. |
| 7,855,755 B2 | 12/2010 | Weller et al. |
| 8,154,418 B2 | 4/2012 | Peterson et al. |
| 8,764,256 B2 | 7/2014 | Foote et al. |
| 9,041,806 B2 | 5/2015 | Baur et al. |
| 2013/0242586 A1 | 9/2013 | Huizen et al. |
| 2014/0277825 A1* | 9/2014 | Tippelhofer .......... G08G 1/167 701/1 |
| 2017/0297493 A1* | 10/2017 | Gillespey ................. B60R 1/08 |

\* cited by examiner

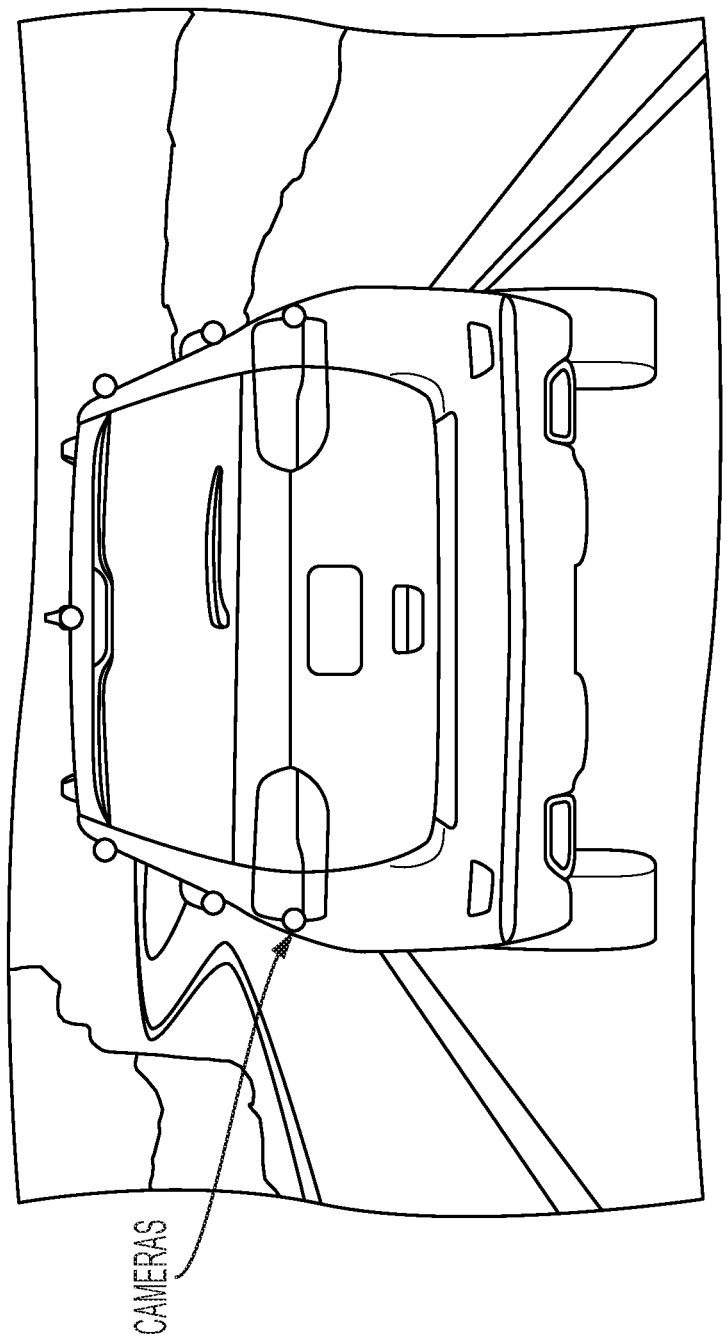

MIRROR DISPLAY SYSTEM WITH BLIND SPOT DISPLAY

CROSS REFERENCE TO RELATED APPLICATION

The present application claims the filing benefits of U.S. provisional application Ser. No. 62/581,936, filed Nov. 6, 2017, which is hereby incorporated herein by reference in its entirety.

FIELD OF THE INVENTION

The present invention relates to interior rearview mirror systems and, more particularly, to an interior rearview mirror system having a display at the interior rearview mirror for viewing by the driver of the vehicle.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. It is also generally known to provide a display screen at the mirror assembly. A variety of interior and exterior mirror assemblies with indicators and/or displays are known in the art, such as U.S. Pat. Nos. 7,224,324; 7,253,723; 7,255,451; 8,154,418; 5,668,663; 5,355,284; 5,788,357; 6,257,746; 6,005,724; 5,481,409; 6,111,683; 6,045,243; 6,264,353; 6,512,624; 6,356,376; 2,263,382; 2,580,014; 3,266,016; 4,499,451; 4,588,267; 4,630,904; 4,623,222; 4,721,364; 4,906,085; 5,313,335; 5,587,699; 5,575,552; 5,436,741; 5,587,699; 5,938,320; 6,700,692 and 5,786,772, which are all hereby incorporated herein by reference in their entireties.

SUMMARY OF THE INVENTION

The present invention provides a vision system for displaying video images of captured images for viewing by a driver of a vehicle. A video display screen is disposed in the vehicle cabin and is viewable at the interior rearview mirror assembly. The display screen, when actuated, displays video images derived from image data captured by a plurality of vehicle-mounted rearward viewing cameras that have respective fields of view rearward of the vehicle. The display screen is actuated responsive to a user's or driver's touch at a turn signal indicator stalk or actuator, where the touch does not actuate the turn signal of the vehicle, but actuates the display screen so the driver can view the video images at the interior mirror before actuating the turn signal indicator and proceeding with a lane change.

These and other objects, advantages, purposes and features of the present invention will become apparent upon review of the following specification in conjunction with the drawings.

BRIEF DESCRIPTION OF THE DRAWINGS

FIG. 6 is a rear elevation of a vehicle equipped with multiple rearward viewing cameras.

DESCRIPTION OF THE PREFERRED EMBODIMENTS

Figure 1:
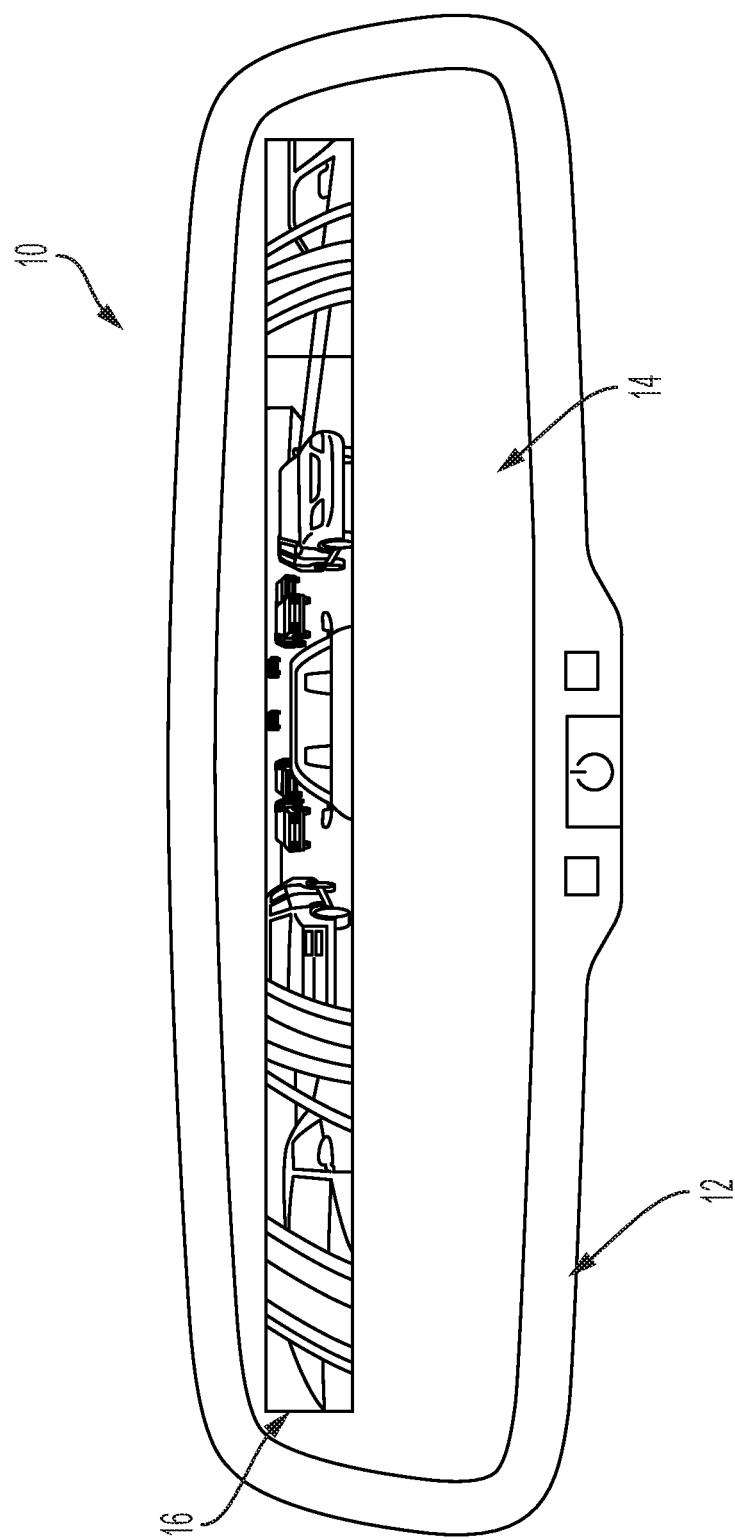
FIG. 1 is a plan view of an interior rearview mirror assembly suitable for use with the display system of the present invention.

Referring now to the drawings and the illustrative embodiments depicted therein, an interior rearview mirror assembly 10 for a vehicle includes a casing 12 that houses a reflective element 14 and a display device, which provides a display area 16 visible to the driver of the vehicle through the reflective element 14 (FIG. 1). The present invention provides a display system that can display video images across the width of the reflective surface of the interior rearview mirror assembly. The display screen provides a wide angle display across the mirror reflective element, in order to provide displayed images of the blind spot region for viewing by the driver of the vehicle while the driver is normally operating the vehicle.

As shown in FIG. 1, the display area or the video display screen disposed behind the reflective element spans almost the entirety of the width of the reflective element (such as greater than 75 percent of the reflective element width or greater than 90 percent of the reflective element width). Also, the height of the display area or the video display screen disposed behind the reflective element spans a small part of the height of the reflective element (such as less than ½ of the reflective element height or less than ⅓ of the reflective element height or less than ¼ of the reflective element height). Thus, the display area may provide a narrow strip display across an upper (or lower) region of the reflective element, such that the driver of the vehicle, when the display is activated and viewable at the reflective element, can still view the mirror-reflected rearward view behind the vehicle via the mirror reflector of the mirror reflective element.

Figure 2:
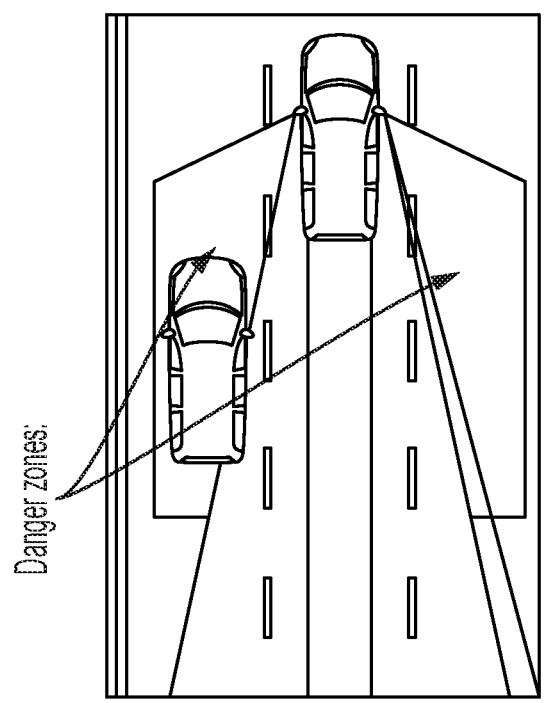
FIG. 2 is a plan view of a vehicle equipped with the vision and display system of the present invention.

As shown in FIG. 2, when a vehicle is traveling along the road, there are regions (blind spot regions) where another vehicle may be present and not readily viewable by the driver of the subject vehicle when viewing the exterior rearview mirrors. Changing lanes can be dangerous as drivers sometimes miss observing other vehicles, which may be in the "blind spot," before executing a maneuver. The system of the present invention provides a system that allows for safer lane changes by providing the driver with views and audible/haptic alerts if vehicles or other road users are in the blind spot before actually making a maneuver.

Blind spot detection systems use ultrasonic sensors to detect other vehicles. Such information may be displayed to the driver either at the exterior side mirror or inside the vehicle. Sometimes an audible alert is sounded when the turn signal is applied, or a haptic feedback is provided if a lane change is attempted when another vehicle is sensed to be present at the side lane adjacent the subject vehicle. With these methods, the turn signal has to actually be pressed, or a lane change initiated before feedback is provided. The presence of another vehicle in the blind spot is usually indicated at the side mirror regardless of whether a maneuver is attempted.

Figure 3:
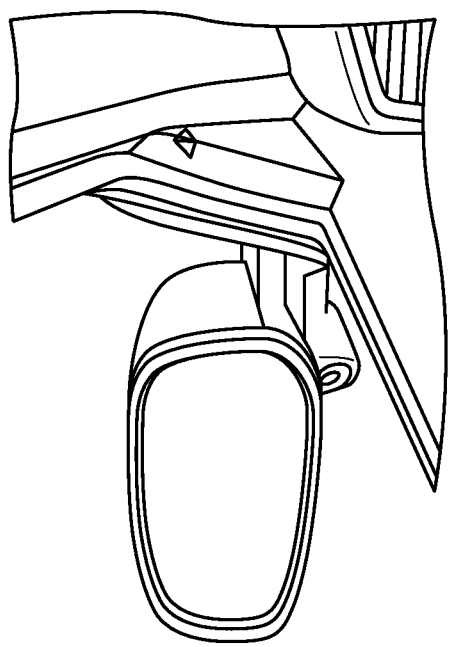
FIG. 3 is a perspective view showing a camera mounted at an exterior rearview mirror of the vehicle.

Optionally, exterior viewing cameras (FIG. 3) may be disposed at the side and/or rear of the vehicle (see also FIG. 6) to capture image data representative of the regions to the side and rear of the vehicle. The system may process captured image data to provide displayed images for viewing by the driver of the vehicle.

Figure 4:
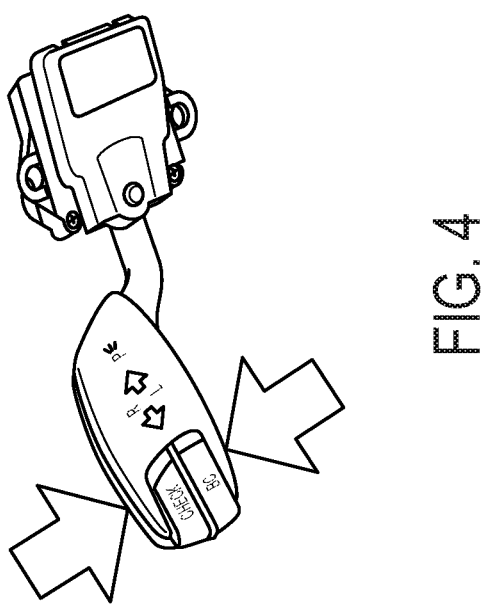
FIG. 4 is a perspective view of a turn signal indicator that is suitable for use with the vision and display system of the present invention.

During operation of the system of present invention, when the "mirror-signal-maneuver" process is started, the driver can check the mirrors, and simultaneously touch the turn signal column stalk to activate a view of the blind spot that would then be displayed or projected at the interior rearview mirror (as shown in FIG. 1). The display of the images could be in addition to existing warning methods. This could be adapted such that only the left blind spot is displayed when the area on the column stalk is touched (for a left-turn), and vice-versa (see FIG. 4). For example, the turn signal indicator (such as a turn signal indicator as shown in FIG. 4 that would extend to the left of the steering column) may have an upper touch feature that activates the display to show images of the blind spot region at the left side of the vehicle, such as when a blind spot detection system also detects a vehicle at the left side of the vehicle, and a lower touch features that activates the display to show images of the blind spot region at the right side of the vehicle, such as when a blind spot detection system also detects a vehicle at the right side of the vehicle. Optionally, the entire wide angle display of images is provided when the turn signal actuator is touched.

Figure 5:
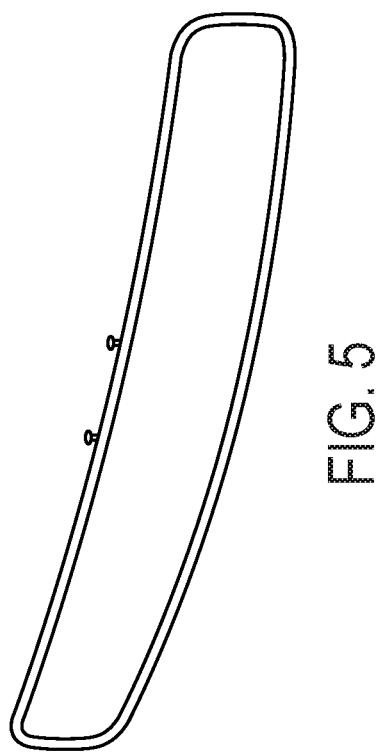
FIG. 5 is a perspective view of a panoramic mirror suitable for use with the vision and display system of the present invention.

As shown in FIG. 1, the display may provide a panoramic view display derived from the image data captured by multiple exterior viewing cameras. The system includes software to create the panoramic view based on the image data from the cameras (such as by stitching or merging the captured image data to provide a composite image as shown in FIG. 1). The system may provide the display at a wide panoramic mirror (FIG. 5), which may comprise a curved widened mirror to enhance the display of the panoramic images. The system may provide a signal to the body control module (BCM) or other controller that the driver is checking to make a maneuver, such as when the touch-look feature at the turn signal actuator is activated, which could then be used for audible or haptic alerts.

Thus, when the turn signal stalk or actuator is touched, but not pressed or actuated, such as at the locations indicated in FIG. 4, a panoramic view of the blind spots is shown at the rearview mirror. This display may remain activated or may be enhanced when the turn signal is fully depressed, particularly if the system detects the presence of another vehicle at the particular or respective side lane adjacent to the subject vehicle. Haptic signals could be added for feedback through the steering wheel or seat or the like, and/or an audible alert or sound may be provided, if a vehicle is sensed in the blind spot region while the driver is checking before maneuvering by using the touch-look feature. The rear/side viewing camera(s) could be placed at any location in accordance with the Original Equipment Manufacturer's preferences, with software used to generate a consolidated panoramic view to include the rearward view and the blind spot regions, which is then displayed at the interior rearview mirror.

Changes and modifications to the specifically described embodiments may be carried out without departing from the principles of the present invention, which is intended to be limited only by the scope of the appended claims as interpreted according to the principles of patent law.

The invention claimed is:

1. A mirror display system for a vehicle, said mirror display system comprising:
   an interior rearview mirror assembly comprising a mirror head adjustably mounted at a mounting structure at an interior portion of a vehicle, said mirror head having a mirror reflective element that is viewable by a driver of the vehicle;
   wherein said mirror reflective element comprises a transflective mirror reflector disposed at a mirror substrate;
   a display device disposed at said mirror head, said display device comprising a video display screen that is disposed behind said mirror reflective element, wherein said video display screen, when actuated, is viewable through said transflective mirror reflector of said mirror reflective element by the driver of the vehicle;
   wherein said video display screen has a height less than ⅓ of the height of said mirror reflective element;
   wherein said video display screen, when actuated, displays video images derived from image data captured by one or more of a plurality of vehicle-mounted cameras that have respective fields of view exterior of the vehicle;
   wherein said plurality of vehicle-mounted cameras comprises a left-side camera having a field of view encompassing an area sideward and rearward at a left side of the vehicle;
   wherein said plurality of vehicle-mounted cameras comprises a right-side camera having a field of view encompassing an area sideward and rearward at a right side of the vehicle;
   wherein said video display screen is actuated responsive at least in part to a driver's touch at a user-operable turn signal actuator of the vehicle;
   wherein, responsive to driver's touch at a first region of the turn signal actuator of the vehicle, said video display screen displays video images derived from image data captured by said left-side camera so as to display video images of the area sideward and rearward at the left side of the vehicle; and
   wherein, responsive to a driver's touch at a second region of the turn signal actuator of the vehicle, said video display screen displays video images derived from image data captured by said right-side camera so as to display video images of the area sideward and rearward at the right side of the vehicle.

2. The mirror display system of claim 1, wherein said video display screen, when actuated, displays video images derived from image data captured by a rear camera disposed at a rear portion of the vehicle having a field of view rearward of the vehicle.

3. The mirror display system of claim 1, wherein said left-side camera comprises a driver-side camera disposed at a driver side of the vehicle and having a field of view encompassing a blind zone at the driver side of the vehicle, and wherein said right-side camera comprises a passenger-side camera disposed at a passenger side of the vehicle and having a field of view encompassing a blind zone at the passenger side of the vehicle.

4. The mirror display system of claim 1, wherein the first region of the turn signal actuator comprises an upper region of the turn signal actuator, and wherein the second region of the turn signal actuator comprises a lower region of the turn signal actuator.

5. The mirror display system of claim 1, wherein the area sideward and rearward at the left side of the vehicle encompassed by said left-side camera comprises a left-side blind zone of a left-side exterior mirror when the left-side exterior mirror is viewed by the driver of the vehicle, and wherein the area sideward and rearward at the right side of the vehicle encompassed by said right-side camera comprises a right-side blind zone of a right-side exterior mirror when the right-side exterior mirror is viewed by the driver of the vehicle.

6. The mirror display system of claim 1, wherein said video display screen spans more than 75 percent of the width of said mirror reflective element.

7. The mirror display system of claim 6, wherein said video display screen, when actuated responsive to the driver's touch at the first region of the turn signal actuator, displays video images derived from image data captured by said left-side camera at a left side portion of said video display screen, and wherein said video display screen, when actuated responsive to the driver's touch at the second region of the turn signal actuator, displays video images derived from image data captured by said right-side camera at a right side portion of said video display screen.

8. The mirror display system of claim 7, wherein said video display screen, when actuated, displays video images derived from image data captured by a rear camera disposed at a rear portion of the vehicle having a field of view rearward of the vehicle, and wherein said video display screen displays video images derived from image data captured by the rear camera at a central region of said video display screen between the left side portion and the right side portion.

9. The mirror display system of claim 1, wherein said video display screen displays video images derived from image data captured by said left-side camera responsive at least in part to detection, via processing of image data captured by said left-side camera, of another vehicle at the area sideward and rearward at the left side of the vehicle.

10. The mirror display system of claim 1, wherein said video display screen displays video images derived from image data captured by said right-side camera responsive at least in part to detection, via processing of image data captured by said right-side camera, of another vehicle at the area sideward and rearward at the right side of the vehicle.

11. The mirror display system of claim 1, wherein the driver's touch at the first or second region of the turn signal actuator that actuates said display device does not actuate a turn signal of the vehicle.

12. The mirror display system of claim 11, wherein, after the driver's touch at the turn signal actuator actuates said display device, said display device remains activated responsive to the driver actuating the turn signal actuator to actuate a turn signal of the vehicle.

13. A mirror display system for a vehicle, said mirror display system comprising:
an interior rearview mirror assembly comprising a mirror head adjustably mounted at a mounting structure at an interior portion of a vehicle, said mirror head having a mirror reflective element that is viewable by a driver of the vehicle;
wherein said mirror reflective element comprises a transflective mirror reflector disposed at a mirror substrate;
a display device disposed at said mirror head, said display device comprising a video display screen that is disposed behind said mirror reflective element, wherein said video display screen, when actuated, is viewable through said transflective mirror reflector of said mirror reflective element by the driver of the vehicle;
wherein said video display screen has a height less than ⅓ of the height of said mirror reflective element;
wherein said video display screen, when actuated, displays video images derived from image data captured by one or more of a plurality of vehicle-mounted cameras that have respective fields of view exterior of the vehicle;
wherein said plurality of vehicle-mounted cameras comprises a driver-side camera having a field of view encompassing an area sideward and rearward at a driver side of the vehicle;
wherein the area sideward and rearward at the driver side of the vehicle encompassed by said driver-side camera comprises a driver-side blind zone of a driver-side exterior mirror when the driver-side exterior mirror is viewed by the driver of the vehicle;
wherein said plurality of vehicle-mounted cameras comprises a passenger-side camera having a field of view encompassing an area sideward and rearward at a passenger side of the vehicle;
wherein the area sideward and rearward at the passenger side of the vehicle encompassed by said passenger-side camera comprises a passenger-side blind zone of a passenger-side exterior mirror when the passenger-side exterior mirror is viewed by the driver of the vehicle;
wherein said video display screen is actuated responsive at least in part to a driver's touch at a user-operable turn signal actuator of the vehicle;
wherein, responsive to driver's touch at an upper region of the turn signal actuator of the vehicle, said video display screen displays video images derived from image data captured by said driver-side camera so as to display video images of the area sideward and rearward at the driver side of the vehicle;
wherein, responsive to a driver's touch at a lower region of the turn signal actuator of the vehicle, said video display screen displays video images derived from image data captured by said passenger-side camera so as to display video images of the area sideward and rearward at the passenger side of the vehicle;
wherein the driver's touch at the upper or lower region of the turn signal actuator that actuates said display device does not actuate a turn signal of the vehicle; and
wherein, after the driver's touch at the turn signal actuator actuates said display device, said display device remains activated responsive to the driver actuating the turn signal actuator to actuate a turn signal of the vehicle.

14. The mirror display system of claim 13, wherein said video display screen, when actuated, displays video images derived from image data captured by a rear camera disposed at a rear portion of the vehicle having a field of view rearward of the vehicle.

15. The mirror display system of claim 13, wherein said video display screen spans more than 75 percent of the width of said mirror reflective element.

16. A mirror display system for a vehicle, said mirror display system comprising:
an interior rearview mirror assembly comprising a mirror head adjustably mounted at a mounting structure at an interior portion of a vehicle, said mirror head having a mirror reflective element that is viewable by a driver of the vehicle;
wherein said mirror reflective element comprises a transflective mirror reflector disposed at a mirror substrate;
a display device disposed at said mirror head, said display device comprising a video display screen that is disposed behind said mirror reflective element, wherein said video display screen, when actuated, is viewable through said transflective mirror reflector of said mirror reflective element by the driver of the vehicle;

wherein said video display screen spans more than 75 percent of the width of said mirror reflective element, and wherein said video display screen has a height less than ⅓ of the height of said mirror reflective element;

wherein said video display screen, when actuated, displays video images derived from image data captured by one or more of a plurality of vehicle-mounted cameras that have respective fields of view exterior of the vehicle;

wherein said plurality of vehicle-mounted cameras comprises a left-side camera having a field of view encompassing an area sideward and rearward at a left side of the vehicle;

wherein said plurality of vehicle-mounted cameras comprises a right-side camera having a field of view encompassing an area sideward and rearward at a right side of the vehicle;

wherein said video display screen is actuated responsive at least in part to a driver's touch at a user-operable turn signal actuator of the vehicle;

wherein, responsive to driver's touch at a first region of the turn signal actuator of the vehicle, said video display screen displays video images derived from image data captured by said left-side camera so as to display video images of the area sideward and rearward at the left side of the vehicle;

wherein said video display screen, when actuated responsive to the driver's touch at the first region of the turn signal actuator, displays video images derived from image data captured by said left-side camera at a left side portion of said video display screen;

wherein, responsive to a driver's touch at a second region of the turn signal actuator of the vehicle, said video display screen displays video images derived from image data captured by said right-side camera so as to display video images of the area sideward and rearward at the right side of the vehicle;

wherein said video display screen, when actuated responsive to the driver's touch at the second region of the turn signal actuator, displays video images derived from image data captured by said right-side camera at a right side portion of said video display screen;

wherein the driver's touch at the first or second region of the turn signal actuator that actuates said display device does not actuate a turn signal of the vehicle; and wherein, after the driver's touch at the turn signal actuator actuates said display device, said display device remains activated responsive to the driver actuating the turn signal actuator to actuate a turn signal of the vehicle.

17. The mirror display system of claim 16, wherein said video display screen, when actuated, displays video images derived from image data captured by a rear camera disposed at a rear portion of the vehicle having a field of view rearward of the vehicle, and wherein said video display screen displays video images derived from image data captured by the rear camera at a central region of said video display screen between the left side portion of said video display screen and the right side portion of said video display screen.

* * * * *